US009161095B2

(12) United States Patent
Mack et al.

(10) Patent No.: US 9,161,095 B2
(45) Date of Patent: Oct. 13, 2015

(54) EXTENDING BLACKOUT CONTROL

(71) Applicant: General Instrument Corporation, Horsham, PA (US)

(72) Inventors: Robert E. Mack, Collegeville, PA (US); Niranjan R. Samant, Lansdale, PA (US); Lawrence D. Vince, Lansdale, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 64 days.

(21) Appl. No.: 13/774,489

(22) Filed: Feb. 22, 2013

(65) Prior Publication Data

US 2014/0245341 A1    Aug. 28, 2014

(51) Int. Cl.
*H04N 7/16* (2011.01)
*H04N 21/647* (2011.01)
*H04N 21/222* (2011.01)
*H04N 21/254* (2011.01)
*H04N 21/258* (2011.01)
*H04N 21/45* (2011.01)
*H04N 21/454* (2011.01)

(52) U.S. Cl.
CPC ..... *H04N 21/64715* (2013.01); *H04N 21/2221* (2013.01); *H04N 21/2541* (2013.01); *H04N 21/25841* (2013.01); *H04N 21/4524* (2013.01); *H04N 21/4542* (2013.01)

(58) Field of Classification Search
CPC .... H04N 7/165; H04N 21/4532; H04N 21/84
USPC .......................................................... 725/25
See application file for complete search history.

(56) References Cited

U.S. PATENT DOCUMENTS

| 5,235,643 | A | 8/1993 | Anderson et al. |
| 7,543,317 | B2* | 6/2009 | Kahn et al. ...................... 725/25 |
| 2002/0051540 | A1 | 5/2002 | Glick et al. |
| 2007/0074260 | A1* | 3/2007 | Elstermann .................. 725/117 |
| 2009/0187938 | A1 | 7/2009 | De Heer et al. |

(Continued)

FOREIGN PATENT DOCUMENTS

| WO | 2006/091304 A2 | 8/2006 |
| WO | 2008/027331 A2 | 3/2008 |

OTHER PUBLICATIONS

D. Naor, et al., "Revocation and Tracing Schemes for Stateless Receivers", International Association for Cryptologic Research, Feb. 24, 2001, 22 pgs.

(Continued)

*Primary Examiner* — Benjamin R Bruckart
*Assistant Examiner* — Anthony Bantamoi
(74) *Attorney, Agent, or Firm* — Lori Anne D. Swanson

(57) ABSTRACT

Systems and methods for blackout management in media distribution systems may include a central data center in a service provider's domain. The central data server may coordinate with a blackout manager that implements control features for blackout. In contrast to (or to supplement) blackout control solutions that require integrated receiver decoders (IRD)s to be physically installed at each of the regional headends in the service provider network, the blackout manager may provide three functions: 1) a Virtual IRD (VIRD) function 2) access control functions via access control component, and 3) VIRD-to-EndPoint mapping function in the linkage manager.

16 Claims, 4 Drawing Sheets

(56) References Cited

U.S. PATENT DOCUMENTS

2011/0041148 A1  2/2011  Piepenbrink et al.
2013/0260796 A1* 10/2013 Hasek ..................... 455/456.3

OTHER PUBLICATIONS

PCT Search Report & Written Opinion, Re: Application #PCT/US2014/015000, dated Apr. 11, 2014.

* cited by examiner

|  | VIRD | VIRD ADDRESS | TRANSPORT STREAM | STREAM # |
|---|---|---|---|---|
| EX 1) | CAP A | VIRD A1 | .TS 220 | BLACKS OUT 215 |
| EX 2) | CAP B | VIRD A2 | .TS 221 | BLACKS OUT 216 |

EXTENDING BLACKOUT CONTROL

BACKGROUND

Blackout management is desirable to control access to media content, and is typically used to prevent the delivery of certain media content to specific marketing areas. In many scenarios, blackout management is required as a result of a contractual agreement with the rights holders, such as a contractual agreement that commonly exists between a professional sports league, the rights holder, and the sports content broadcaster, the content programmer.

Existing solutions for blackout require the physical installation of integrated receiver decoder (IRD)s in the regional headends of the service provider's network. Content programmers provide media content to service providers and the service providers distribute the content to its subscribers via regional headends. Content programmers blackout access to media content by issuing commands that control designated integrated receiver decoder(s) (IRDs) in the regional headends that serve the blackout region.

It is inefficient and impractical for service providers to deploy IRDs in each of their regional headends to support blackout control. Consider a scenario in which fifteen different regions are supported by a respective fifteen regional headends. In each of the fifteen headends, physical IRDs have to be installed for each transport stream for each content programmer that requires blackout processing. So, in a single headend, often as many as one hundred IRDs have to be deployed (doubling that amount for redundancy) in each regional headend. For just fifteen regions, the number of IRDs to be installed in each regional headend becomes innumerous. Furthermore, to integrate the physical IRD in each headend, ancillary equipment is often needed at both the input of the IRD (to format the inputs to a format readable by the IRD) and at the output of the IRD (to multiplex the output streams).

The current infrastructure, therefore, requires significant power, shelf space, and network router ports sufficient to support all of the IRDs in each regional headend. Thus, the current solutions for blackout management are less than optimal and improved designs are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Blackout of media content occurs when a broadcaster of the media content prevents the presentation of the media content to at least one broadcast region. More particularly, for instance, a television program may be blacked-out in a certain geographic location or market, such that the television program is not presented to that geographic location or market. Media content data may include audio, video, textual data, or any combination thereof. For example, media content data may include televised sporting events, television programs, movies, radio programs, etc. Examples of media content include, but are not limited to, live television, recorded television, time-shifted programs, movies, any type of audio or video, music, on-demand media content, gaming content, any type of media with a display component, or the like.

Managing blackouts is often complicated due to the rules and regulations of a specific agreement, changing conditions such as variable schedules (e.g., sporting event may be delayed or extended due to rain, overtime, etc), different rules for different regions, the size of the regions to be defined by each blackout, the obligations on the content programmer to the rights holder, disaster modes, how the solution is to be executed, and the like. Thus, content programmers desire a flexible solution for blackout management. It is noted that while numerous references made herein are related to blacking out sporting events, other types of events or programming may be subject to blackouts, such as concerts or plays that are available for broadcast.

According to an example, a method and system described herein allows for managing blackout of media content data.

Figures 1, 1A:
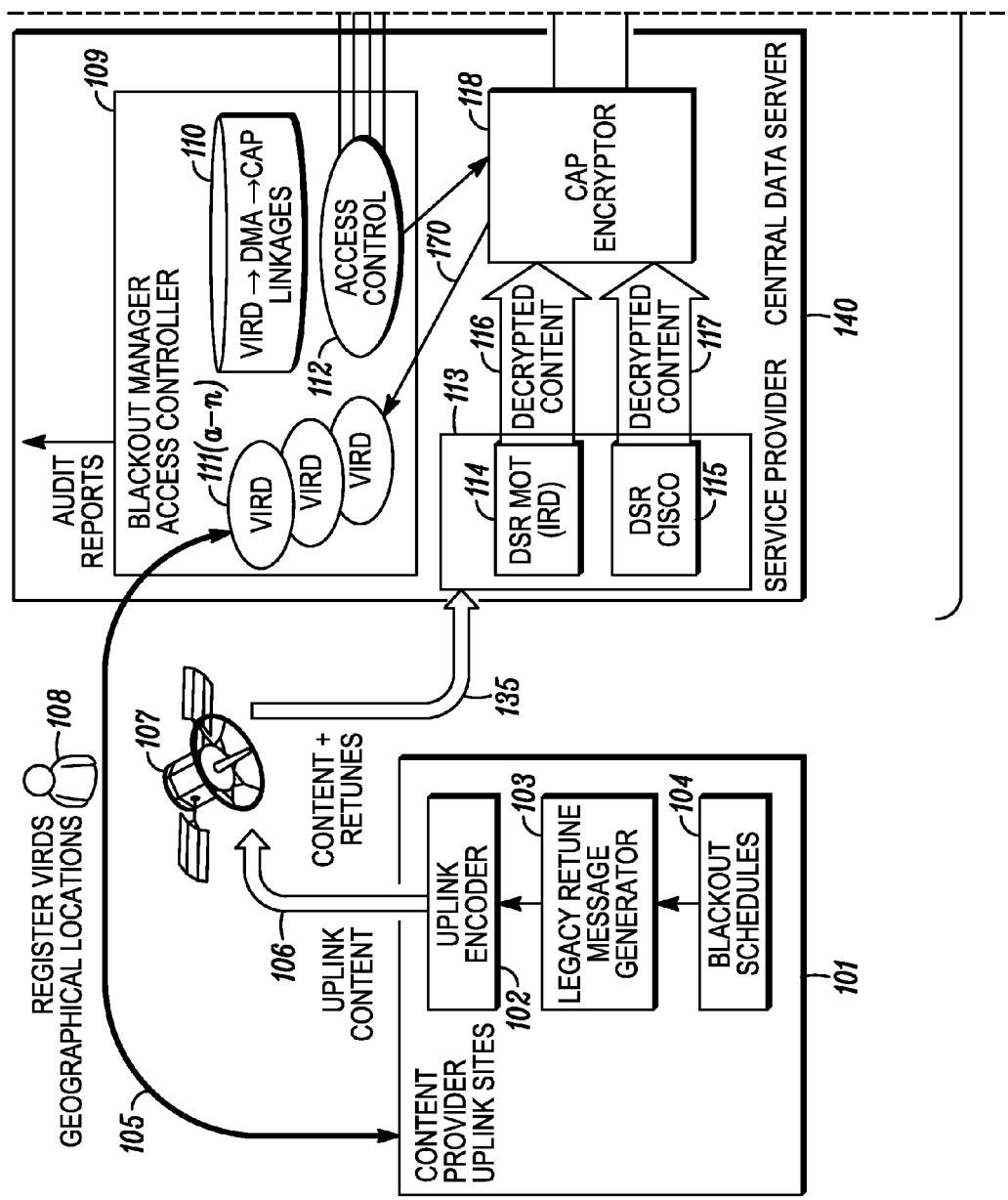
FIG. 1 depicts a system diagram that illustrates a content programmer and a service provider network for effecting blackout management.
Figure 1B:
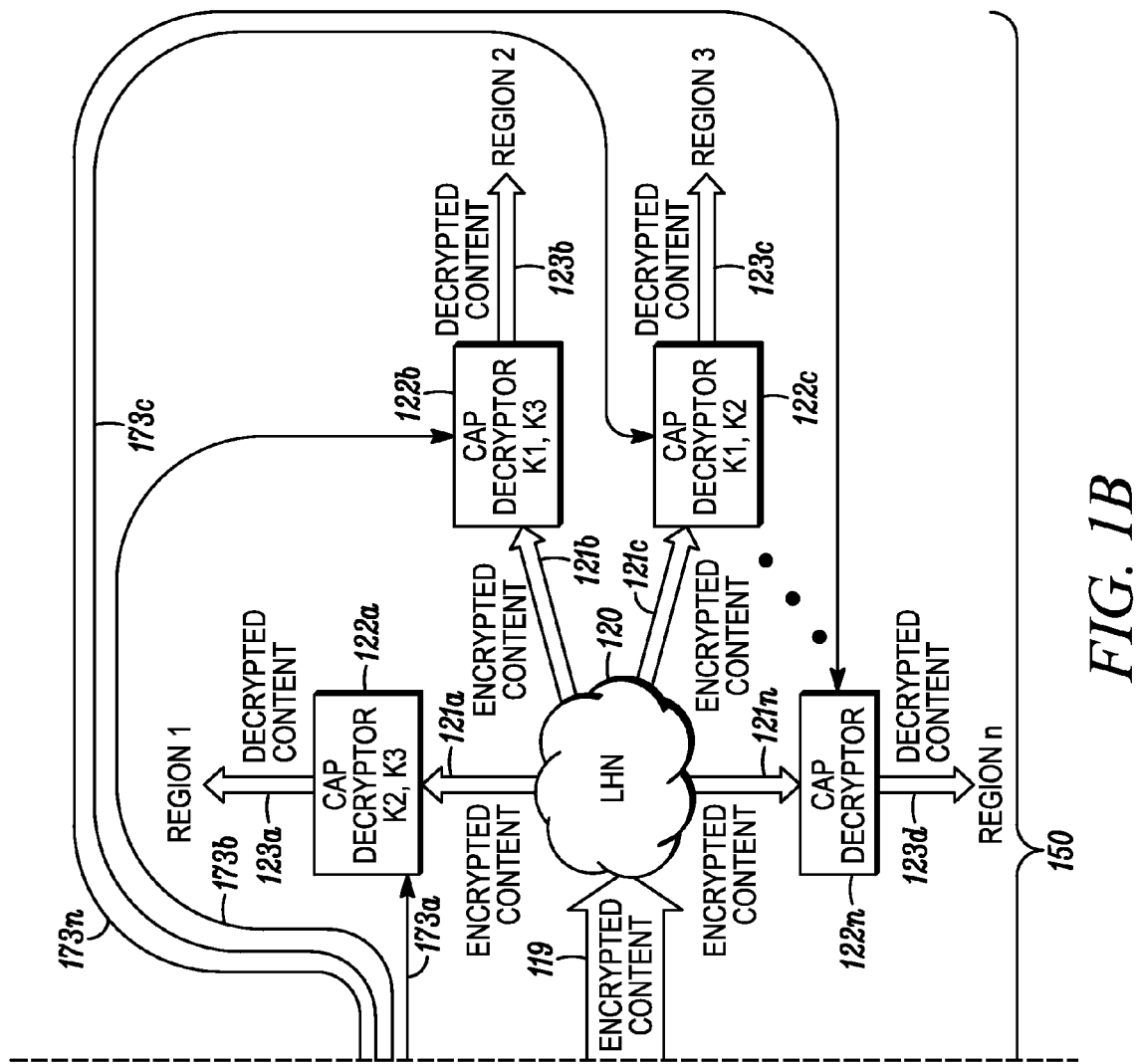

FIG. 1 depicts an example system for blackout management in accordance with the disclosed techniques. As described in more detail below, a content programmer 101 may coordinate with a central data center 140 in the service provider's domain 150 to enforce blackouts of certain content to certain regions.

A content programmer 101 may be any entity that provides media content to a service provider 150 for distribution to subscribers. For example, the content programmer 101 may be the Entertainment and Sports Programming Network (ESPN)®, which creates media content by televising sporting events and developing television programs, movies, etc. Similarly, the Turner Broadcasting System (TBS)®, is another example of a programmer, which also broadcasts media content, such as television programs, sporting events, and movies.

References to a service provider 150, the service provider's network 150, and service provider's domain 150 are used herein interchangeably to describe the service provider 150 or entities using an infrastructure in the domain of the service provider 150 for delivering media content from the content programmers to users, e.g., subscribers. The service provider network 150 includes the infrastructure in the service provider's domain 150 that receives a media content stream from the content programmer 101 and transmits the media content stream to end-users or subscribers. In this regard, the service provider 150 may, for instance, be a multiple service operator (MSO) network, telecommunications company, or satellite broadcaster, which includes, for example, local cable companies, such as Verizon®, Cox®, Comcast®, etc., and satellite media companies, such as DirecTV®, Dish Network®, etc.

The content programmer 101 may transmit content 106 via an uplink path for delivery to a service provider 150. Uplink content 106 as referred to herein includes content transmitted in a transmission path from the content programmer 101 for delivery to a service provider 150. The uplink content 106 may include transport streams, where each transport stream may carry multiple program data for multiple channels from the content programmer 101. Transport streams allow for multiplexing of digital video and audio, which means the data may be combined into a single synchronous transmission bit stream.

In FIG. 1, the uplink path for uplink content 106 refers to the communication link used for the transmission of signals from a ground-based terminal to a satellite 107. Signals transmitting a program may be beamed to a satellite 107 and returned to receivers in the service provider's network, such as satellite dishes. It is noted that while a satellite communication path is shown FIG. 1 for facilitating transmission of content from the content programmer 101 to the service provider 150, any suitable network for uplink content 106 with retune information to a service provider 150 is contemplated. The uplink content 106 may be transmitted over a variety of standard mediums such as internet protocol (IP) networks, internet protocol video (IPv) networks, Ethernet, Passive Optical Networks, ATSC Over the Air networks, Cable TV networks, and more. For example, content programmers may distribute content over a distribution network such as satellite distribution network, a terrestrial based IP distribution network (e.g. routed network), a cellular network, an over the air (OTA) network, radio frequency (RF) network, or the like. As shown in FIG. 1, the content programmer 101 may transmit content 106 via uplink sites to satellite 107 for transmission of content 135 to the service provider network 150. While a representative content programmer 101 is shown in FIG. 1, the central data server 140 in the service provider's domain 150 can receive and process multiple channels from multiple content programmers for distribution to subscribers.

Content 135 may include transport streams with channel data and the content programmer 101 generated retune messages that signal blackout/substitution events. Retune messages, described in more detail below, are sent in advance from the uplink to the satellite receiver and are configured to identify programs that will be blacked out or the regions in which a program is to be blacked out. Via receivers, such as digital satellite receivers 114, 115, the central data server 140 may receive the content 135. The service provider network 150 may include a digital satellite receiver (DSR) (e.g., DSR Motorola 114, DRS Cisco 115) that receives the signal 135 from the satellite 107. The signaling between the content programmer 101 and service provider 150, whether via a satellite 107 network or some other manner, may be defined differently for different content/service providers. For example, a signal 135 from ESPN to Comcast may be different from a signal 135 from ESPN to Verizon, depending on the configuration of the components sending and receiving the signals.

The service provider's delivery platform, e.g., Hybrid Fiber Coax (HFC) network, passive optical network (PON), determines the manner of processing and transmitting content to the provider's subscribers. For example, in a HFC network, the central data server 140 in the service provider 150 may convert RF signals from an antenna to optical transmissions and transmit the optical signals to the regional headends. The regional headends may transmit the optical signals further downstream to nodes having an optic-to-RF converter for delivery to the home. Prior to distribution, as disclosed herein, the service provider 150 may process the transport streams and retune data in content 135 and distribute encrypted content to regional headends in accordance with a blackout scheme.

In the example system in FIG. 1 blackouts can be generated at the content programmer 101, provisioned (e.g., via a retune message in uplink content 106) via a transmission link (e.g., satellite 107), and can be nationwide, regional, or specific areas (e.g., specific zip codes). For example, ESPN or TBS may be content programmers that dictate the blackout schedule 104 for content that it provides to the servicer providers to control the distribution of the content to the subscribers.

In the embodiment shown in FIG. 1, the central data center 140 in the service provider's domain 150 includes a blackout manager 109 that implements control features for blackout, thus also referred to herein as a blackout manager 109 & access controller. In contrast to (or to supplement) blackout control solutions that require integrated receiver decoders (IRD)s to be physically installed at each of the regional headends in the service provider network 150, the blackout manager 109 & Access Controller component 109 may provide three functions: 1) a Virtual IRD (VIRD) function via VIRDs 111(a-n), 2) access control functions via access control component 112, and 3) VIRD-to-EndPoint mapping function in the linkage manager 110, each described in more detail below.

The content programmer 101 may coordinate with the service provider network 150 via the blackout manager 109 to receive VIRD 111(a-n) information. The virtual IRD (VIRD) function in the blackout manager 109 manages the addresses of each of the virtual IRDs 111(a-n). The VIRDs 111(a-n) may emulate control for different regions serviced by the service provider 150, each VIRD 111(a-n) having a VIRD address. There may be a VIRD 111(a-n) for each transport stream available from each content programmer 101. The service provider 150 (e.g., Comcast) may register the VIRD 111(a-n) addresses with the content programmer 101 (e.g., ESPN) via message link 105. The registering information may include identifying information of the VIRD (e.g., VIRD address, region covered by the VIRD, service, etc). The service provider 150 may also communicate information on how the content programmer 101 can communicate to the virtual IRD.

A content programmer 101 can identify a VIRD address in a retune message to command a blackout for the corresponding VIRD region. In other words, the content programmer 101 may define blackout rules in terms of a VIRD address that emulates control of the headend that carries the content to the subscribers. Each headend may distribute content to client devices (e.g., set top box, access node, other network appliance) within a particular geographical area.

The content programmer 101, e.g., ESPN, TBS, etc, may comprise content programmer 101 uplink sites for providing the uplink content 106 intended for delivery to the subscribers of a service provider network 150. The uplink sites may use an uplink encoder 102 to process uncompressed media content and compress it for transmitting the uplink content 106 in content bearing signals to satellite 107 (representative of any number of satellites or networks or satellites). For example, the uplink encoder 102 may compress baseband video or audio content based on a video standard (e.g., MPEG-2 standard developed by the Moving Picture Experts Group/MPEG).

The content encoded by the uplink encoder 102 and sent in the uplink content 106 may include one or more retune commands. The retune command may identify a particular VIRD address within the service provider's domain 150, where the identity of a particular VIRD address in the retune message serves to route the command for the blackout of the associated content to the VIRD servicing the affected region. The retune message may be generated by a function within the uplink control system. In the example embodiment shown in FIG. 1, the content programmer 101 is in control of managing blackout schedules 104 and a retune message generator 103. The retune commands may be generated based on one or more of the blackout schedules 104. The retune message generator 103 may use the VIRD information previously received from the service provider 150 via message link 105 to identify the VIRD addresses that correspond to the desired blackout region/regions. The uplink encoder 102 may encode the retune message to be provided with the corresponding event content in the uplink content 106 to satellite 107.

A blackout schedule 104 may outline the rules for blackout in various ways. The rules may be defined based on the regions serviced by the service provider 150 distributing content from the content programmer 101. The rules may define the blackout for a specified period of time or for a time linked to the length of a blacked out program. The blackout rules may be defined based on the service providers that distribute the content from the content programmer 101. For example, a first service provider 150 may be provided exclusive rights to provide particular content, but a second service provider 150 may receive the same content and have to enforce a blackout of the content. In a specific example, a service provider 150, e.g., Comcast, may be given exclusive rights to present a boxing event but a second service provider, e.g., Verizon, may receive the boxing event. A blackout rule may require the second service provider 150, e.g. Verizon, to blackout the boxing event content received from the content programmer 101.

In an example, blackout rules are defined in contractual agreements based on marketing or business rules. For example, blackout management agreements may be set up between media rights holders or organizations (e.g., sports organizations) and content programmers (e.g., ESPN) to prevent programming from being aired in certain areas. For example, a content programmer 101 may be a national broadcaster, such as ESPN, with a breadth of sports programming. According to a blackout management agreement, ESPN may be excluded from airing a sports event in areas surrounding the venue in order to increase game attendance. Thus, a program may be blacked-out because a broadcaster may lack the legal rights to air the television program in the geographic location or market.

The retune command specifies at least one VIRD address corresponding to the region for blackout. There may be more than one VIRD that services a particular region, but in an example enforcement of a blackout schedule 104, a first VIRD 111a may be registered with a content programmer 101 for the Philadelphia region and a second VIRD 111b be registered with a content programmer 101 for the Pittsburgh region. Both the first and second VIRDs 111a, 111b may be scheduled to receive sports content, such as a Philadelphia vs. Pittsburgh baseball game. In this example, the game is occurring in Pittsburgh and according to a blackout schedule 104, the game is to be blacked out in Pittsburgh but not blacked out in Philadelphia. The content programmer 101 may generate a retune command associated with the content to be blacked out, where the retune command identifies the VIRD 111a that corresponds to the Pittsburgh region.

The service provider 150, who has previously registered VIRD addresses 111(a-n) for various service locations with the content programmer 101 (e.g. ESPN) via link 105, receives signal 135 from the satellite 107 including the retune command specifying at least one VIRD address. Thus, the service provider 150 has registered with the content programmer, via the VIRD function, the VIRDs 111(a-n) that emulate a physical IRD for the purposes of receiving retune commands inserted by the content programmer 101. In the Pittsburgh vs. Philadelphia baseball game example, the baseball game content along with the retune command identifying VIRD 111a may be provided to the service provider 150 in content 135.

It is noted that the transport streams in content 135 from a content programmer may include multiple services. For example, a transport stream may include a) ESPN classic channel b) ESPN baseball and c) ESPN news. Thus, for each channel or service that requires a blackout, a VIRD address is identified. For example, if the transport stream carrying the Pittsburgh vs. Philadelphia baseball game content includes other services or channel information, the retune command may identify the VIRD address but also identify which service within the transport stream is to be blacked out.

The service provider DSR 114, 115 decrypts the content in the signal 135 and transmits the decrypted content, e.g., 116, 117, to a multiplexer 118, shown in this example embodiment as CAP encryptor 118. Any number of multiplexers 118 may be implemented in the service provider network 150. The CAP encryptor 118 shown is an example of a multiplexer that can process many transport streams. Thus, while two DSRs, DSR 114 and DSR 115, are shown providing decrypted content 116, 117 respectively, to the CAP Encryptor 118, many DSRs may feed decrypted content in to each single multiplexer 118. For example, if 20-30 DSRs transmit signals through a single CAP, the CAP can manage encryption of all of the received transport streams. The long haul network 120 may be a network for distributing content encrypted by the CAP Encryptor 118 to a plurality of regional headends in the service provider network 150. Thus, as disclosed herein, the multiplexer 118 may encrypt content for distribution over a long haul network 120, where the content is encrypted according to a blackout scheme as coordinated within the service provider 150's network by the blackout manager 109.

The decrypted content 116, 117 received at the CAP encryptor 118 may include a transport stream and series of related messages. A transport stream may include a service stream, such as streams having various services (e.g., ESPN news with audio and video streams). The transport stream may also include control streams (e.g., streams with entitlement management messages (EMM)). Further, retune messages may be embedded in the decrypted content coming from a DSR 114, 115, either embedded in the transport stream or provided with the transport stream. The multiplexer 118 can extract retune information and program information from the decrypted content 116, 117 and send the extracted information 170 to the blackout manager 109 in accordance with the VIRD(s) specified in the signal 135. For example, for every transport stream received by the CAP encryptor 118, the CAP encryptor 118 can extract the retune message for each. The CAP encryptor 118 may provide a retune stream 170 to the blackout manager 109 with a plurality of VIRD addresses identified for the related content from an aggregate of transport streams received by receivers such as receivers 116, 117.

The blackout manager 109 includes VIRD functionality including VIRDs 111(a-n), an access control component 112, and a VIRD-to-EndPoint linkage manager 110. Each VIRD 111(a-n) may have a unique VIRD address used to filter incoming retune commands from the uplink control system's retune broadcast, where the incoming retune commands identify a VIRD by its address. The blackout manager 109 may receive a retune message targeted to a particular VIRD 111(a-n) or may filter a retune stream to identify respective retune commands for one or more VIRD addresses included in the stream.

In an example scenario, consider a retune message generated by a sports broadcaster content programmer 101. In this example, assume that a sports game is to be blacked out in the Pittsburgh region, and the VIRD 111a address that corresponds to the Pittsburgh region is VIRD address=5. The content programmer 101 identifies the Pittsburgh VIRD address=5 in the retune message, which is encrypted with the transport stream carrying the sports program and sent via the uplink to a satellite. The DSR decrypts the satellite side transport stream, retaining any retune information and program information, and delivers the decrypted transport stream to the multiplexer 118. Following receipt of the retune message and transport stream carrying the sports program by the service provider 150, a multiplexer, such as a CAP encryptor 118 extracts the program information and retune information embedded in the transport stream. The multiplexer 118 provides the extracted information 170 to the blackout manager 109. The blackout manager 109 receives the retune message or stream, filters as necessary, and identifies the VIRD address=5 that corresponds to the sports program in the transport stream.

The access control component 112 may coordinate encryption by the encryptor 118 and decryption by the CAP decryptors 122(a-n) according to a blackout scheme, based on the filtering performed by the VIRDs 111(a-n). The CAP encryptor 118 re-encrypts content for transmission via the long haul network 120 to decryptors 122(a-n) in each of the regional headends. Based on the keys used to encrypt the data at the CAP encryptor 118 prior to transmission over the long haul network 120, and based on the encryption keys available at each decryptor 122(a-n), each of the CAP decryptors 122(a-n) may or may not have access to decrypt the content. The access control component 112 may direct the CAP encryptor 118 via message 171 to encrypt in accordance with the blackout scheme. Further, the access control component may coordinate with each of the decryptors 122(a-n) in each of the regional headends via communication links 172(a-n). For example, the access control component 112 may identify the decryption capabilities of each of the regional decryptors 122(a-n) via corresponding communication links 172(a-n). The access control component 112 may share information with each of the decryptors 122(a-n) for purposes of key management, Secure Socket Layer (SSL) distribution, substitution management, and the like.

The blackout manager 109 can use the VIRD-to-EndPoint linkage manager 110 to identify the CAP decryptor that corresponds to a region associated with a VIRD address. For example, in FIG. 1, if Region 3 is the Pittsburgh region that corresponds to VIRD address 5, the VIRD-to-EndPoint linkage manager 110 stores a mapping between Region 3 and the VIRD address 5. The VIRD-to-EndPoint linkage manager 110 also maps an identity of the decryption device, such as a CAP decryptor, that performs decryption for the Region 3 headend. Thus, from a VIRD-to-EndPoint Mapping database, the blackout manager 109 can identify the CAP decryptor in Region 3 as a target for blackout for a sports program that was transmitted with a VIRD address=5.

In an embodiment, a VIRD-to-EndPoint linkage manager 110 maintains a mapping between the encryption device in the service provider 150's headend, such as multiplexer 118, and a decryption device near the service provider 150 access network, such as CAP decryptors 122a, 122b, and 122c. A decryptor can handle multiple services, but a particular service is associated with one decryptor for each location or region. Thus, a unique decryptor may be set up in each region (e.g., according to a geographical region code) where a particular service will be received and potentially blacked out.

The service provider 150, through a blackout manager 109 user interface (UI) for example, may establish a relationship between a service being received for a particular VIRD and a particular location, and the decryption device in that location. It is noted that while each VIRD address may be mapped to a CAP decryptor identity in a particular region or regional headend, each VIRD address may also map to a specific service. Thus, a VIRD may correspond to a whole transport stream or a particular service within a transport stream.

With the appropriate decryption keys, the CAP decryptors 122(a-n) may decrypt the encrypted content 121(a-n) for distribution to the subscribers in the service area of the regional headend. For example, the access controller component 112 may command the encryptor to insert a message into encrypted content 119 that will be carried down to the regional CAP decryptors 122(a-n) in encrypted content 121(a-n). The message inserted may identify the decryption key to be used to decrypt the content.

Example decryptors (e.g., CAP decryptors 122a, 122b, 122c) in the regional headends of the servicer provider network 150 are shown in FIG. 1. Multiple keys will be provided to each decryptor 122a, 122b, 122c in a key set. However, not all decryptors will have all keys in the set. For example, if three decryptors are going to be receiving EPSN Sports in three different blackout regions, then the Region 1 decryptor (decryptor 122a) might receive keys for Regions 2 and 3 (K2, K3), Region 2 decryptor (decryptor 122b) might receive keys for Regions 1 and 3 (K1, K3), and the Region 3 decryptor (decryptor 122c) might receive keys for Regions 1 and 2 (K1, K2). Note in this example that each decryptor received all keys in the set except for the key associated with their own region.

In an example, consider CAP decryptor 122c having keys K1 and K2. If the message inserted identifies key K3 for the encrypted content 121c or at least one service within that encrypted content 121c, CAP decryptor 122c will not have the capability to decrypt the content 121c (or at least the one service within that content 121c). Thus, once the blackout manager 109 identifies which CAP decryptors can or cannot decrypt content based on the blackout scheme, the access controller 112 may direct the CAP encryptor to re-encrypt the received content 116, 117 such that the re-encryption is based on which CAP decryptors are allowed to decrypt (in accordance with the blackout rules).

In another example of key management, the encryption CAP can encrypt with a common key and encrypt that key unique for each blackout region it serves. For example, for 10 different regions, a CAP encryptor may encrypt with a common key for a period of time. The common key will be key wrapped (i.e., the key used for encrypting is encrypted) by another key (e.g., a region key), where each region has a unique region key. Multiple Entitlement Control Messages (ECMs) can be inserted into the transport stream, each carrying the content key encrypted with a region key. So, in an example of 10 regions, 10 ECMs would be inserted, where each ECM covers the same content key. When there is a blackout in a region, the CAP encryptor can change the content key and exclude the ECM for the affected (intended blackout) region.

In an embodiment, the blackout manager 109 may provide a priori encryption rules to the CAP encryptor 118 based on a VIRD address 111(a-n), thereby directing the encryptor 118 how to encrypt according to a VIRD address identified and extracted by the encryptor from the decrypted content 116, 117. Whether the CAP encryptor 118 or blackout manager 109 initiates the encryption of the content for distribution of the encrypted content 119 over the long haul network 120, either of the CAP encryptor 118 or blackout manager 109 may insert an inband message to signal the downstream decryptors handling that particular service that a key change is going to take place and it inserts the key. In the example where the content is to be blacked out in Region 3, the message would direct the decryptors to use key 3 because that is the key that decryptor 122c in Region 3 does not have, resulting in a blackout to Region 3 for the specified content. The encryptor 118, therefore, would use key 3 for the encryption of the service for the duration of the blackout.

At the conclusion of the blackout, another inband message may be inserted by the CAP encryptor 118 signaling the use of a key that each of the downstream decryptors has, including a key held by decryptor 122c.

It is noted that if there is no blackout associated with a particular program or transport stream, the content programmer 101 virtual stream (e.g., an Entitlement Management Message), may indicate no blackout (i.e., no VIRD address is specified related to a blackout). Thus, in this case, the encryptor 118 performs encryption with a key that can be decrypted by any of the decryptors in the service provider network 150 receiving the streams from the central data server 204. An Entitlement Management Message is an encrypted message that contains private conditional access information about the authority a viewer has to acquire reception for such services as cable or satellite television.

Described in more detail, the access control component 112 may facilitate the blackout, such as the example blackout of the sports program to the CAP decryptor 122c in Region 3. The access control component 112 can distribute key sets to each decryption device, such as CAP decryptor 122a, 122b, 122c, according to a blackout scheme. For example, for each CAP decryptor 122a, 122b, and 122c that will be receiving content carrying the sports program, the access control component 112 may facilitate the coordination of the key sets between the cable plant and the regional headends to enforce blackout in the appropriate regions. The access control component 112 can direct the CAP encryptor 118 to switch to a key for encryption and then only distribute that key to the CAP decryptors in Regions that are permitted to present the program. The access control component 112 may preposition key sets a priori such that the key sets are distributed to the CAP decryptors prior to any defined blackouts. Thus, the keys can be delivered a priori instead of in real time to avoid possible unreliabilities in the network. In another example, unique region keys (carried within Entitlement Management Messages) can be transmitted in advance to the CAPs. Each decrypting CAP associated with a particular blackout region will receive an EMM that securely delivers a unique region key. The Access Control System could deliver each CAP's region key via an IP connection or via in-band methods. A common content key being used by the encrypting CAP to encrypt the content, will also be encrypted (or covered producing an Entitlement Control Message—ECM) uniquely for each region using each particular region's unique region key, and multiple protected content keys (i.e. multiple versions of the ECM) will be inserted in-band along with the content stream protected by the content key. Each CAP will therefore be able to recover the common content key provided they have received an EMM region key that allows it to be decrypted for subsequent use by its decryptor. During a blackout of a particular region, the encrypting CAP will change the content key in use and will insert multiple protected versions of the content key (EMMs), one for each authorized region. However, the CAP associated with the blacked out region will not see a protected content key (for the duration of the blackout) for its use and will therefore lose the ability to decrypt the content as long as it is denied a content key protected by its region key.

In the example above, the access control component 112 can direct the CAP encryptor 118 to encrypt the transport stream for delivery in encrypted content 119 to each of the headends via the long haul network 120, and distribute the decryption key to the CAP decryptors in Regions that do not require blackout of the program. For example, the access control component 112 may insert a message in the encrypted data 119 that identifies the appropriate decryption key, identifying a key that the blackout regions do not have, to ensure that the decryptors in the blackout regions are unable to decrypt the content. For example, the access control component 112 can direct the CAP encryptor 118 to encrypt a transport stream using key x, but then only distribute a corresponding decryption key to CAP decryptors 122a and 122b, but not decryptor 122c. Thus, the CAP decryptor in Region 3 will be unable to decrypt the transport stream, thereby blacking out the program in Region 3.

Although the access control component 112 is shown in the service provider's domain 150, the access control function may enable the blackout manager 109 to employ access control across the service provider 150's distribution network such that content is protected and controlled by the content programmer 101 and not the service provider 150 from the point of content reception to the access network. By coordinating with the blackout manager 109, the content programmer 101 may define the rules for blackout in terms of the VIRD addresses that emulate control of blackout by the regional headends. The content programmer may include in a retune message information regarding encryption and decryption to be enforced by the access control component 112. The VIRD-to-EndPoint 110 linkage information may be provided to the content programmer via link 105. Thus, the content programmer may have the information it needs to control blackouts. For example, via the access control function defining decryption and encryption keys, the content programmer 101 may dictate that a game is permitted for presentation in Philadelphia but blacked out in Pittsburgh by identifying the VIRD that emulates control of the Pittsburgh regional headend, and sending a retune message in the uplink identifying the VIRD address and the content to be blacked out. Thus, the content provider may control regional service substitution or muting during a blackout with no control asserted by the service provider.

The mapping of the CAP decryptors, their regions, and what decryption keys they have may be stored in the VIRD-to-EndPoint linkage manager 110. In this manner, the access control component 112 can select encryption and decryption keys based on functionality of each CAP decryptor, thus enabling the blackout manager 109 to prevent certain regions from being able to decrypt the encrypted content, and enforcing distribution and blackout of the content in accordance with a blackout scheme.

Using the disclosed techniques, service providers 150 may have many ways to utilize encryption/decryption. There are other manners to enforce the decryption/encryption, such as sending a command to a CAP decryptor 122(a-n) and commanding them to drop a program, etc. For example, the service provider 150 may wish to maintain the signaling inband to reduce or eliminate the chance that drop/blackout information is not provided, such as if that part of the network is down (e.g., the service provider 150 may maintain the signaling inband at the central encryptor 118, instead of via blackout manager 109, thus sending the blackout info directly to the CAP decryptors from the CAP encryptor 118).

As described herein, via the VIRDs 111(a-n), encryption can be controlled in the CAP encryptor 118 according to the content programmer 101 blackout schedule 104. Further, as described, by including the VIRDs 111(a-n) at a central location such as in the blackout manager 109 in the service provider's domain 150, the multiplexer 118 is able to encrypt content based on a blackout scheme prior to distribution of the content over a long haul network 120 to headends. Thus, the VIRDs 111(a-n) may perform blackout functionality at the blackout manager 109 as a substitute to performing blackout functionality in physical IRDs installed at regional headends (which requires decryption and re-encryption based on the blackout scheme after receipt over the long haul network 120 from the cable plant).

Figure 2:
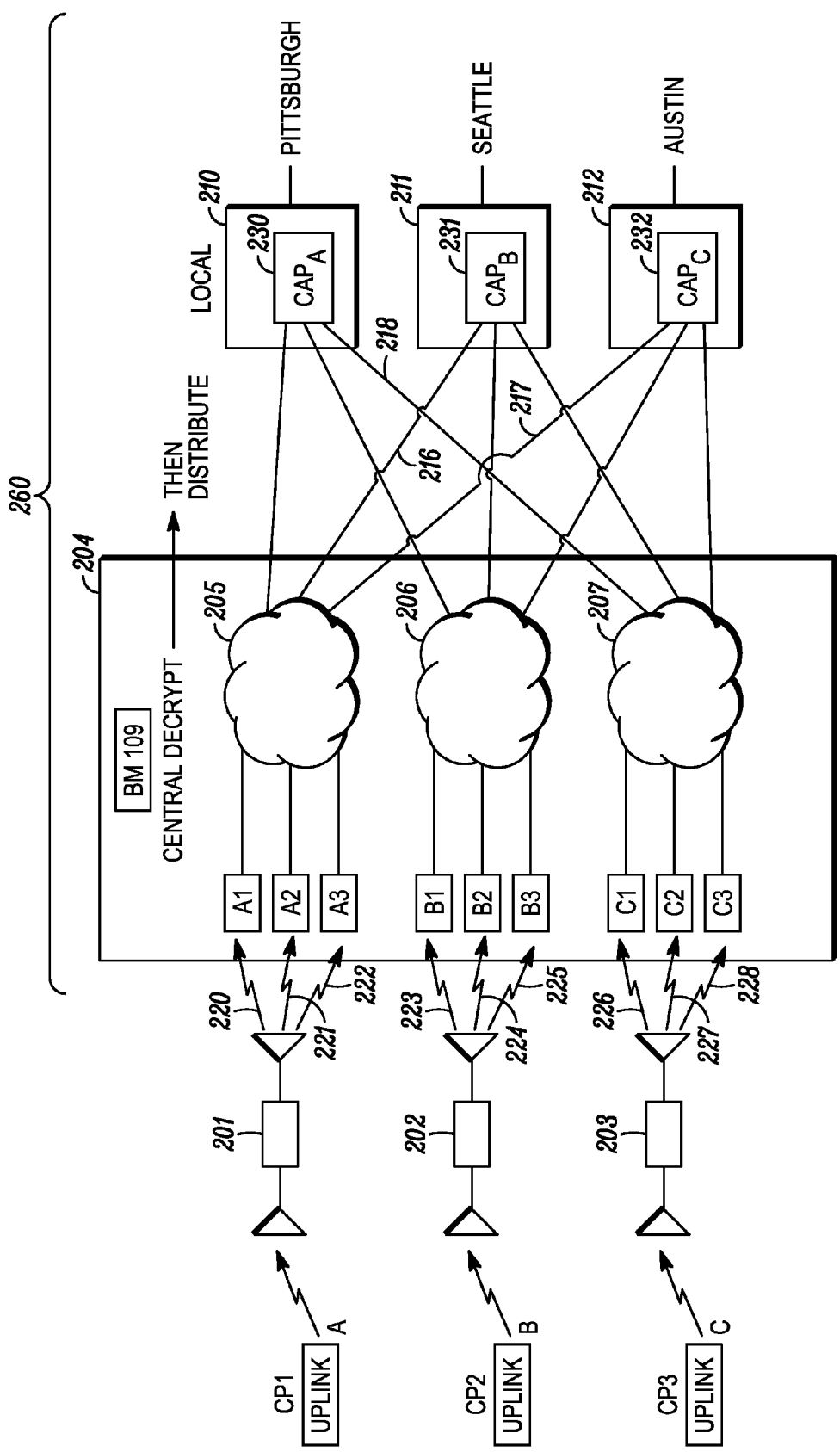
FIG. 2 depicts another system diagram for effecting blackout management.

FIG. 2 depicts a simplified network diagram for an example scenario of blackout control using example VIRDs A1, A2, A3, B1, B2, B3, C1, C2, and C3 in a central data server 204 in the service provider's domain 150. Multiple content programmers CP1, CP2, CP3 may transmit content to satellite networks 201, 202, 203 for distribution to a service provider 260. For example, the content programmer CP1 may be an ESPN content programmer, content programmer CP2 may be a TBS content programmer, and content programmer CP3 may be an FOX content programmer.

The number of content programmers may be numerous and may transmit to the same or different uplink entities, e.g., to the same or different satellites 201, 202, 203 in a satellite distribution system. In this example, content programmers CP1, CP2, and CP3 (e.g., ESPN, TBS, FOX, etc) distribute content A, B, and C, respectively, via an uplink to each of satellites 201, 202, and 203, respectively. Further, each content programmer CP1, CP2, CP3 may provide content for multiple channels in uplink content A, B, C. For example, uplink content A transmitted by ESPN (CP1) may include content for 1) a professional sports channel, 2) a college sports channel, and 3) a movie channel.

The satellites 201, 202, and 203 may distribute content to the service provider 260, such as in transport streams 220, 221, 222, 223, 224, 225, 226, 227, 228 carrying program data and retune commands. Via satellite receivers, the service provider may receive the streams 220-228. Thus, the service provider 260 may receive and process multiple channels of content from multiple content programmers CP1, CP2, CP3.

The service provider 260 maintains, at the central data server 204, VIRDs that emulate control for each of the regions serviced by the service provider 260. As shown in this example, the service provider network 260 may manage VIRDs A1, A2, A3, B1, B2, B3, C1, C2, and C3 in a central data server 204. Each VIRD corresponds to a content programmer and a region to which the service provider 260 provides content from the content programmer. There may be a VIRD for each transport stream available from a content programmer. In this embodiment, VIRDs A1, A2, and A3 may be linked to content programmer CP1; VIRDs B1, B2, and B3 may be linked to content programmer CP2; and VIRDs C1, C2, and C3 may be linked to content programmer CP3.

In the example shown in FIG. 2 and for purposes of discussion, the regions serviced by the service provider 260 (e.g., Comcast) include: Pittsburgh, via headend 230 with CAP decryptor 210; Seattle, via a headend 231 with CAP decryptor 211; and Austin, via headend 232 with decryptor 212. In this example scenario, the service provider 260 receives content programmer CP1 (e.g., ESPN) via transport streams 220, 221, and 222 from satellite 201. The service provider 260 (e.g., Comcast) may manage VIRDs A1, A2, and A3 linked to the content programmer CP1 (e.g., ESPN), and the transport streams 220, 221, and 222 are filtered respectively to VIRDs A1, A2, and A3 based on the VIRD address in each stream. VIRD A1 may emulate control related to headend 230, VIRD A2 may emulate control related to headend 231, and VIRD A3 may emulate control related to headend 232. Thus, VIRD A1 emulates control for Pittsburgh, VIRD A2 emulates control for Seattle, and VIRD A3 emulates control for Austin in this example.

Encryptors 205, 206, and 207 in the central data server 204 receive decrypted content from respective DSRs (i.e. physical IRDS) and may aggregate multiple decrypted transport streams. For example, encryptor 205 may aggregate transport streams received from VIRDs A1, A2, and A3. In embodiments, the encryptors may aggregate transport streams received from VIRDs associated with a plurality of content programmers.

As described above with respect to FIG. 1, the encryptors coordinate with blackout manager 109 in accordance with a blackout scheme for distribution to the regional headends 230, 231, 232. The blackout manager 109 may facilitate enforcing the blackout scheme by mapping the VIRDs in the central data server 204 to the decryptors in the corresponding service regions, e.g., decryptors 210, 211, 212 shown in FIG. 2. Thus, in the example above, blackout manager 109 may maintain a mapping of decryptor 210, the decryptor in a regional headend 230 that services Pittsburgh, to VIRD A1 in the central data server 204 that emulates control of the Pittsburgh region.

As described above with respect to FIG. 1, the blackout manager 109 may enforce blackouts based on the mapping by directing encryption in the central data server encryptor based on a blackout scheme. In other words, the content for distribution to the regional headends 230, 231, 232 from the encryptors may be encrypted with an encryption key, which is inserted into the content for delivery. To enforce blackout, the encryption key is selected by the blackout manager 109 based on the decryption capabilities of the decryptors in the regional headends, e.g., 210, 211, 212. For example, if the VIRD address in the retune message from a content programmer CP1 indicates that a program should be blacked out in Pittsburgh, and decryptor 210 serves Pittsburgh, then the encryption key selected by the blackout manager 109 to be inserted into the transport stream delivered to the regional headends 230, 231, and 232 is one that decryptor 210 servicing Pittsburgh is not capable of using for decrypting. In other words, if decryptor 210 receives a transport stream 215 that has been encrypted based on an encryption/decryption key to which decryptor 210 does not have access, then decryptor 210 is unable to decrypt the data and the program in the encrypted transport stream 215 is thereby blacked out to the Pittsburgh region. Decryptors 211 and 212, however, have the appropriate encryption/decryption key and can therefore decrypt the encrypted transport streams 216, 217 and deliver the content to the serviced subscribers.

In another example, if the content programmer dictates that a game should be allowed in Philadelphia, but blacked out in Pittsburgh, the content programmer may identify the VIRD in the Pittsburgh regional headend and send a retune message the uplink with the VIRD address. Upon receipt of the retune message, the VIRD in a central data server in the service provider domain 260 facilitates blackouts of the game in Pittsburgh. Thus, rather than locating one physical IRD in Philadelphia and another physical IRD in Pittsburgh, virtual IRDs are able to emulate the control for Philadelphia and Pittsburgh.

It is noted that the regions serviced by the regional headends, such as headends 230, 231, and 232, are not restricted to cities or specific areas. The regions can be nationwide, regional, or specific areas (e.g., specific zip codes), for example. The area serviced by a headend or, more granularly, the area serviced by a decryptor within the headend that distributes data to the subscribers, may define the region affected by blackout. For example, a decryptor 210 may service one small town or two decryptors in headend 230 (not shown) may each service half of a town, depending on the geographic size of the town.

In an example scenario, assume that content programmer CP1 is an ESPN sports programmer required to blackout a Pittsburgh baseball game in Pittsburgh. The uplink message A includes the address for VIRD A1, the service provider VIRD linked to content programmer CP1 and the region for blackout, Pittsburgh. VIRD A2 may emulate control for Seattle services, and VIRD A3 may emulate control for Austin services. The VIRDs A1, A2, and A3 and an encryptor 205 may coordinate with a mapping function and access control function in a blackout manager 109, as shown in FIG. 1. Based on the VIRD address included in the uplink message from the content programmer, the baseball game to be distributed by the encryptor 205 is encrypted based on a key provided from blackout manager 109 or, more specifically, provided from the access control component 112. The key provided by blackout manager 109 may be a key that decryptor 211 servicing Seattle and the decryptor 212 servicing Austin are capable of using to decrypt the baseball game in the encrypted transport streams 216 and 217. However, decryptor 210 receives the same baseball game content in encrypted transport stream 215, but does not have a key for decrypting the content.

Decryptor 210, which cannot decrypt the content in stream 215 for at least one channel, may mute the output to the Pittsburgh subscribers or substitutes the baseball game content with other content. For example, the service provider 260 or content programmer may indicate substitute programming that should be delivered to the regional headend instead of the service to be blacked out. In another example, upon receipt of a retune message, the VIRD may ignore the stream and thus not transmit the stream to the encryptor for delivery to the corresponding decryptor in the regional headend.

In another example that includes efficiently distributing a single transport stream (or version/copy of the transport stream) to a plurality of CAPs in each region, the content encryption key used by the CAP can be changed to encrypt to a key the blackout region CAP decryptor does not possess, but the non blackout region CAP decryptors do possess. Thus, the blackout region CAP decryptor would be unable to decrypt the transport stream, but other CAP decryptors in non-blackout regions would be able to decrypt the transport stream for delivery to the subscriber. In another example, the access control component 112 could command the affected CAP decryptor (i.e., the blackout region CAP decryptor) to mute the output to the region or command the CAP decryptor to drop or ignore the content received and replace or substitute the content with an alternative content.

The control of blackouts in the manner disclosed provides opportunities for either or both of the content programmer and service programmer. The disclosed techniques may extend to existing models for legacy networks and IP distribution networks, such that the content programmer may maintain direct control over content blackout/substitution from their uplink control system or other controller at the content programmer's facility. The disclosed techniques, for example, may be incorporated with existing retune commands inserted by the uplink controller.

However, if either of the content programmer or service provider desires to control the substitution of content for blacked out content, the disclosed techniques provide manners for both. The content programmer may have direct access control of content substitution in a highly secure way via coordination with the blackout manager 109 and the access control component. For example, the content provider may access the blackout manager and retrieve audit reports to verify VIRD to DMA to CAP associations and see a history of events. In this manner, the content provider may be provided a desired level of confidence that the blackout asserted by the content provider does in fact result in the region being blacked out.

In another embodiment, the service provider may utilize robust inband signaling methods that are tolerant of network outage problems that might otherwise cause blackouts to fail. For example, if content in a region is to be blacked out, the access control component 112 may send a command to an affected CAP decryptor via a control path link (e.g., out-of band from the content stream). When using out-of band signaling for blackout information, if the control network link is down CAP decryptor may not receive the out-of band command from the access control component 112 that commands the CAP decryptor to drop the content or switch to an alternate key being used during a blackout. Thus, the CAP decryptor may receive the content stream but not the corresponding blackout information. The content may still be delivered without the CAP decryptor receiving the command to drop the content or switch to another key. In the disclosed embodiment, by providing the blackout information in band, the blackout information is delivered with the content. A message carried therein can inform the CAP decryptor what key to use during a blackout. Using in band signaling for blackout information, even if the control network is down, the blackout commands can still be provided.

As described herein, while the content programmer may be the party responsible for informing a VIRD of what to enforce via the retune command in message 135, the virtual IRD provides a manner of enforcing the blackouts by emulating the control aspect of physical IRDs and providing the ability to process retune commands. Thus, an abundance of physical IRDs need not be deployed at each headend in the service provider's network. For example, consider a content programmer that uses four transport streams that distribute content to 10 headends. The service provider may manage four VIRDs in the central data server (e.g., 4 transport streams×1 central data server=4 VIRDs) instead of four physical IRDs in each headend in each region (4 transport streams×10 of headends=40 IRDs). The service provider may manage a limitless number of VIRDs in the central data server as they are software elements running on a computer that minimize the need for installing physical IRDs in each region. The use of virtual IRDs therefore minimizes the consumption of power, heating, switching ports, maintenance, need for software upgrades in each physical IRD, and the like.

Generally described herein are embodiments in which the content programmer controls the uplink encoder 102 for storing rules for blackout and maintains a blackout schedule 104. Thus, in embodiments, the content programmer may dictate the blackout schedule 104 and the service provider may be responsible for enforcing it. However, different manners for coordinating between a content programmer and service provider for managing blackouts is considered that include VIRDs that emulate control of regions for blackout purposes.

Figures 3, 4:
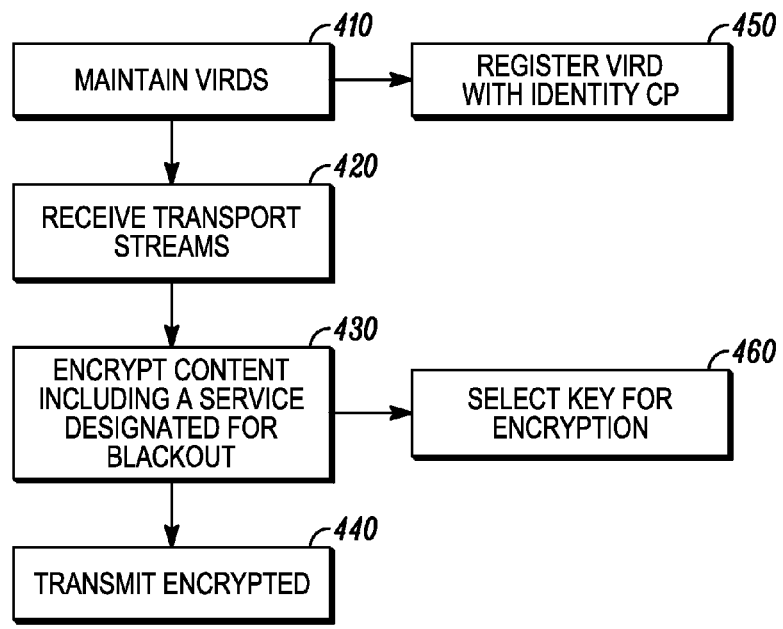
FIG. 3 depicts an example addressing scheme for blackout management.
FIG. 4 depicts a flow diagram of an example embodiment for blackout management.

FIG. 3 depicts an example of a simplified addressing format for the type of information that may be used for the blackout addressing that may be included in a retune message. The content programmer may include an address in a retune message to identify a target VIRD and a program within the transport stream for blackout and/or the region in which the program should be blacked out. The content programmer can use addressing such as that shown in FIG. 3 in the retune message to identify the region for blackout and the service within a transport stream to be blacked out in that region.

A retune message includes an address field, a service number of the particular service (e.g., MPEG service number of a particular MPEG service within the set of all MPEG services that may be carried within a given transport stream. An example addressing scheme in FIG. 3 is based on the example components shown in FIG. 2 and is shown as VIRD ADDRESS.TRANSPORT STREAM.SERVICE #. The VIRD ADDRESS in the example addressing scheme identifies the address of a VIRD in the service provider's domain 150. The VIRD identified by the VIRD address is a VIRD that emulates control for a desired region of blackout. The VIRD address maps to a CAP identity in a particular region. Thus the VIRD address identifies the CAP decryptor and transport stream and service within the transport stream. As previously described, the service provider may register the addressing information with the content programmer so the content programmer can format the address for the retune message appropriately.

The VIRD often maps to a decryptor in one of the regional headends, which may also or instead be identified in the addressing scheme (not shown). The TRANSPORT STREAM portion of the example address identifies the transport stream from the content programmer that contains the relevant program content to be blacked out. A transport stream may carry multiple services or programs. Thus, the SERVICE # portion of the example address identifies the service within the transport stream that is to be blacked out (if it is not the entire stream that is to be blacked out).

In an example scenario and referring back to FIG. 2, the content programmer CP1 is ESPN and, in accordance with a blackout agreement with a sports league, ESPN is required to blackout a baseball game in the Pittsburgh region. The baseball game may be televised in regions outside of Pittsburgh. ESPN provides the content including the baseball game and a retune message in uplink content 106 to satellite 201. Transport stream 220 may include several services, but it is assumed for this example that it includes the ESPN live sports channel that includes the baseball game content identified as service #1. To communicate the requested blackout, ESPN includes a retune message with the uplink content 106 to satellite 201 identifying the VIRD that emulates control for the Pittsburgh region (e.g., VIRD A1), the transport stream with the service to blacked out (e.g., transport stream 220 which includes content for an ESPN live sports channel) and the service within the transport stream to be blacked out (e.g., the baseball game). Thus, in this example, ESPN may include a retune message in the uplink to satellite 201 including example address A1.220.1, where A1 is the address of VIRD A1, 220 represents the address for transport stream 220, and 1 represents that service #1 (the baseball game) is to be blacked out.

Encryptor 205 may distribute encrypted transport streams 215, 216, and 217 over a long haul network 120 to CAP decryptors 210, 211, and 212, respectively. The transmissions of encrypted transport streams 215, 216, and 217 may include the ESPN live sport channel content with the subject baseball game (and may include other services, e.g. channel data/ programs, provide in the uplink by ESPN to the service provider). The encrypted content may be distributed over the long haul network 120 to CAP decryptors 210, 211, and 212, respectively. It is important for ESPN to properly identify which transport stream carries the baseball game content to the service provider. In this manner, the service provider may properly decrypt and encrypt the transport stream 220 in the central data server 204, based on the blackout command, prior to delivery of the encrypted content to the CAP decryptors in the regional headends.

The VIRD identified by the VIRD ADDRESS can process the retune messages addressed to it, where the retune message is passed via the blackout manager by the CAP encryptor from the received transport stream. In accordance with address A1.220.1, VIRD A1 filters the transport stream 220 and encryptor 205 encrypts the content for delivery over the long haul network 120 in order to blackout the baseball game in Pittsburgh. Based on the decryption and encryption of transport stream 220 using a blackout manager 109 as described herein, encryptor 205 may distribute encrypted transport streams 215, 216, and 217 over the long haul network 120. To do this, encryption at the central data server 204 is done using a key that CAP decryptor 210, that maps to VIRD A1 does not have, thus disabling the CAP decryptor 210 ability to decrypt service #1 from encrypted transport stream 215. The result is that the ESPN live sport channel content is blacked out in the Pittsburgh region (i.e., not available/decrypted for distribution to subscribers serviced by headend 230). However, the ESPN live sports channel content in encrypted content streams 216 and 217 may be decrypted by decryptors 211 and 212 and delivered to the subscribers. The retune message dictating the blackout of the baseball game in Pittsburgh may be provided by ESPN until the baseball game is no longer broadcasted or until the blackout rules are otherwise modified.

Examples 2 and 3 in FIG. 3 present additional examples of blackout addressing. In example 2, VIRD A2.TS221.service #1 address identifies service #1, which is filtered by VIRD A2 from transport stream 221, and thereby blacks out service #1 in the encrypted transport streams 216 by encrypting the content in encryptor 205 in a manner that disables decryptor 211's capabilities for decryption. Thus, in this example, service #1 is blacked out in Seattle.

FIG. 4 depicts a flow diagram for an example method using the disclosed techniques for blackout management. At 410, a service provider 150 may maintain a plurality of virtual integrated receiver decoders (VIRDs) in a central data server. Each VIRD may be associated with a region serviced by the service provider. Further, at 450, the service provider 150 may register a VIRD address for each VIRD with a content programmer. At 420, the service provider 150 receives transport streams via an uplink path from the content programmer. The service provider may also receive a retune message corresponding to at least one of the received transport streams. The retune message includes a VIRD address and at least one service in the transport stream designated for blackout. The service provider encrypts content comprising the at least one service in the central data server for delivery to decryptors in each region serviced by the service provider. At 460, a key for encryption of the content may be selected. For example, a blackout manager 109 may select a key for encryption based on the decryption capabilities of the decryptors in each of the service regions. The encryption keys may be selected, and the content thereby encrypted with the selected keys, in accordance with a blackout scheme. For example, an encryption key may be selected that cannot be decrypted by a decryptor in the blackout region. At 440, the encrypted content is transmitted to the decryptors.

While example embodiments of a blackout management system coordinated between a content programmer and service provider, utilizing VIRDs at a central data server in the domain of the service provider, have been described in connection with various computing devices, the underlying concepts can be applied to any computing device or system capable of performing each of the described functions. The various techniques described herein can be implemented in connection with hardware or software or, where appropriate, with a combination of both. Thus, the methods and apparatus for blacking out content, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for managing the blackout scheme. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. Example computer readable media that may be used to store software operable to implement the present invention include but are not limited to conventional computer system RAM, ROM, EPROM, EEPROM, hard disks, or other data storage devices.

While a system for blackout management has been described in connection with the various embodiments of the various Figs., it is to be understood that other similar embodiments can be used or modifications and additions can be made to the described embodiment for performing the same functions without deviating therefrom. For example, one skilled in the art will recognize that the satellite system described in the present application for distributing content from a content programmer to a service provider, the content may be distributed in any applicable environment, whether wired or wireless, and may be applied to any number of such devices connected via a communications network and interacting across the network. Therefore, the techniques disclosed should not be limited to any single embodiment, but rather should be construed in breadth and scope in accordance with the appended claims.

Reference throughout this specification to one embodiment, an embodiment, an example embodiment, an example, or similar language means that a particular feature, structure, or characteristic described in connection with the embodiment is included in at least one embodiment of the present techniques disclosed. Thus, appearances of the phrases in one embodiment, in an embodiment, an example embodiment, an example, and similar language throughout this specification may, but do not necessarily, all refer to the same embodiment.

What is claimed:

1. A method for managing blackout control, the method comprising:
    maintaining a plurality of virtual integrated receiver decoders (VIRDs) in a central data server in a service provider's domain, wherein each VIRD is associated with a blackout region serviced by a service provider, and each VIRD has an address registered with a content programmer;
    receiving transport streams via an uplink path from the content programmer, wherein the transport streams are included in encrypted content received via the uplink path and the encrypted content is decrypted;
    receiving a retune message corresponding to at least one transport stream, the retune message identifying a VIRD address and at least one service in a transport stream designated for blackout to the region corresponding to the identified VIRD address; and
    in the central data server, encrypting content including the at least one service for delivery to decryptors in a plurality of regions serviced by the service provider, wherein encrypting content includes re-encrypting the decrypted transport streams using an encryption key, the retune message is embedded in the decrypted content, and the encrypting blacks out at least one service in the region corresponding to the identified VIRD address,
    wherein the encryption key is selected to exclude decryption by a decryptor in the region corresponding to the identified VIRD address.

2. The method of claim 1, further comprising delivering the encrypted content to the decryptors in the plurality of regions serviced by the service provider.

3. The method of claim 2, wherein included in the encrypted content delivered to the decryptors is metadata that identifies the appropriate encryption key that a decryptor in the region corresponding to the identified VIRD address does not have.

4. The method of claim 1, wherein the decryptors are located in regional headends with unique blackout regions which are serviced by the service provider.

5. The method of claim 1, further comprising:
    extracting the retune message and service information from the decrypted content; and
    identifying the region corresponding to the identified VIRD address from a VIRD address-to-endpoint mapping.

6. The method of claim 1, further comprising providing encryption rules a priori to an encryptor for re-encrypting the content and to the decryptors in the plurality of regions serviced by the service provider.

7. A multiplexer in a central data server for delivering encrypted content to regional headends, the multiplexer including:
    a receiver for receiving decrypted content from a plurality of receivers, the decrypted content including transport streams transmitted via an uplink path from a content programmer and decrypted;
    an extractor for extracting a retune message from the decrypted content, wherein the retune message identifies a VIRD address and at least one service in a transport stream designated for blackout to a region corresponding to the identified VIRD address;
    an encryptor encrypting at least one service in the decrypted content for delivery to decryptors in a plurality of regions serviced by a service provider, wherein encrypting content includes re-encrypting the decrypted transport streams using an encryption key, and the encrypting blacks out the at least one service in the region corresponding to the identified VIRD address,
    wherein the encryption key is selected to exclude decryption by a decryptor in the region corresponding to the identified VIRD address; and
    a transmitter for delivering the encrypted content to the decryptors in the plurality of regions serviced by the service provider.

8. The multiplexer of claim 7, wherein included in the encrypted content delivered to the decryptors is an encryption key that a decryptor in the region corresponding to the identified VIRD address cannot decrypt.

9. The multiplexer of claim 7, wherein the decryptors are located in the regional headends associated with each respective region serviced by the service provider.

10. The multiplexer of claim 7, further comprising a receiver for receiving an encryption key a priori encryption rules a priori to the receipt of the decrypted content.

11. The multiplexer of claim 7, further comprising a receiver receiving an encryption key responsive to the VIRD address identified in the retune message.

12. A system in a service provider's domain for managing blackout control, the system comprising:

a receiver for receiving and decrypting encrypted content via an uplink path from a content programmer, the encrypted content including transport streams;

a multiplexer for extracting at least one retune message corresponding to at least one of the transport streams from the decrypted content and providing a retune message to a blackout manager, wherein the blackout manager:

maintains a plurality of virtual integrated receiver decoders (VIRDs), wherein each VIRD is associated with a region serviced by a service provider, and each VIRD has an address registered with the content programmer, identifies from the retune message a VIRD address and at least one service in a transport stream designated for blackout to the region corresponding to the identified VIRD address, selects an encryption scheme for re-encrypting the transport streams based on capabilities of decryptors in regional headends in the service provider's domain, provides an encryption key to an encryptor that corresponds to the selected encryption scheme, wherein the encryption key is selected to exclude decryption by a decryptor in the region corresponding to the identified VIRD address; and the encryptor for encrypting the at least one service in the transport streams for delivery to the decryptors in the regional headends, wherein encrypting content includes re-encrypting the decrypted transport streams using an encryption key, the retune message is embedded in the decrypted content wherein the encryption blacks out the at least one service in the region corresponding to the identified VIRD address.

13. The system of claim 12, wherein the encryptor delivers the encrypted content to the decryptors in a plurality of regions serviced by the service provider.

14. The system of claim 12, wherein included in the encrypted content delivered to the decryptors is the encryption key that a decryptor in the region corresponding to the identified VIRD address cannot decrypt.

15. The system of claim 12, wherein the decryptors are located in the regional headends associated with each respective region serviced by the service provider.

16. The system of claim 12, the blackout manager identifying the region corresponding to the identified VIRD address from a VIRD address-to-endpoint mapping.

* * * * *